United States Patent [19]

Wettlaufer

[11] Patent Number: 5,031,524
[45] Date of Patent: Jul. 16, 1991

[54] FRUIT AND VEGETABLE JUICE PRESS ASSEMBLY

[76] Inventor: Dale E. Wettlaufer, 7930 Clinton St., Elma, N.Y. 14059

[21] Appl. No.: 384,651

[22] Filed: Jul. 25, 1989

[51] Int. Cl.$^5$ ............................ B30B 15/16; B30B 9/06
[52] U.S. Cl. ............................................ 100/48; 99/495; 99/510; 99/513; 100/53; 100/96; 100/123; 100/130; 100/131; 100/269 A; 241/101.2; 241/277
[58] Field of Search .................. 100/48, 49, 53, 94–97, 100/122, 123, 131, 211, 269 A, 130, 116, 127; 99/509, 510, 445, 513; 241/277, 101.2

[56] References Cited

U.S. PATENT DOCUMENTS

| 74,361 | 2/1868 | Holderman | 100/123 X |
| 1,456,257 | 5/1923 | Stevenson | 100/123 X |
| 1,539,161 | 5/1925 | Columbro | 100/96 |
| 1,698,613 | 1/1929 | Van Duzer | 100/96 |
| 1,992,783 | 2/1935 | Smith . | |
| 2,033,903 | 3/1936 | Smith . | |
| 2,055,871 | 9/1936 | Manning | 100/122 |
| 2,068,013 | 1/1937 | Fridlender et al. | 100/96 X |
| 2,087,435 | 7/1937 | Hubbert | 241/101.2 X |
| 2,409,497 | 10/1946 | Kessel | 100/96 X |
| 2,417,564 | 3/1947 | Newman | 241/277 X |
| 2,550,895 | 5/1951 | Weismueller | 99/510 |
| 2,610,574 | 9/1952 | Winson | 100/96 |
| 2,720,161 | 7/1955 | Kammer | 100/53 X |
| 3,032,087 | 5/1962 | Rodwick . | |
| 4,095,751 | 6/1978 | Artin . | |
| 4,191,103 | 3/1980 | Wettlaufer | 100/123 X |
| 4,610,398 | 9/1986 | Palazzolo . | |
| 4,680,808 | 7/1987 | Paleschuck | 100/122 X |

FOREIGN PATENT DOCUMENTS

| 3720928 | 1/1989 | Fed. Rep. of Germany | 99/513 |
| 581844 | 12/1924 | France | 100/96 |
| 131057 | 4/1929 | Switzerland | 99/513 |

Primary Examiner—Harvey C. Hornsby
Assistant Examiner—Stephen F. Gerrity
Attorney, Agent, or Firm—Hodgson Russ Andrews Woods & Goodyear

[57] ABSTRACT

A fruit and vegetable juice press assembly. The assembly includes a frame (12) which supports a press drive (166, 172, 174) and a food processor drive (120). A removable housing (14) is mounted over the drives, the removable housing including two spaced apart housing portions (76, 78). A platen (170), a press bag (18), and a press bag support (218–248) are located in the pressing chamber between the housing portions. A portion (168) of the press drive extends through an aperture in the sidewall (78.41) of one of the two housing portions, the platen being removably secured to the portion (168). A process (16) is removably secured to the top of the other housing portion (76). The processor includes a grater, an impeller, and a two part or clam-shell discharge chute (100, 106) which, during operation of the grater (84) and impeller (86–90), causes grated pulp material to be discharged into the press bag. A hopper cover (158) and guards (276, 286) to either side of the pressing chamber are provided, which cover and guards must be in place before commencement of the operation of the apparatus. A juice collector (22) is disposed beneath a trough (80) at the bottom of the pressing chamber. Manually engagable start, stop and grind time varying controls (294, 296, 304) are provided, which controls initiate the operation of a controller supported by the frame.

11 Claims, 6 Drawing Sheets

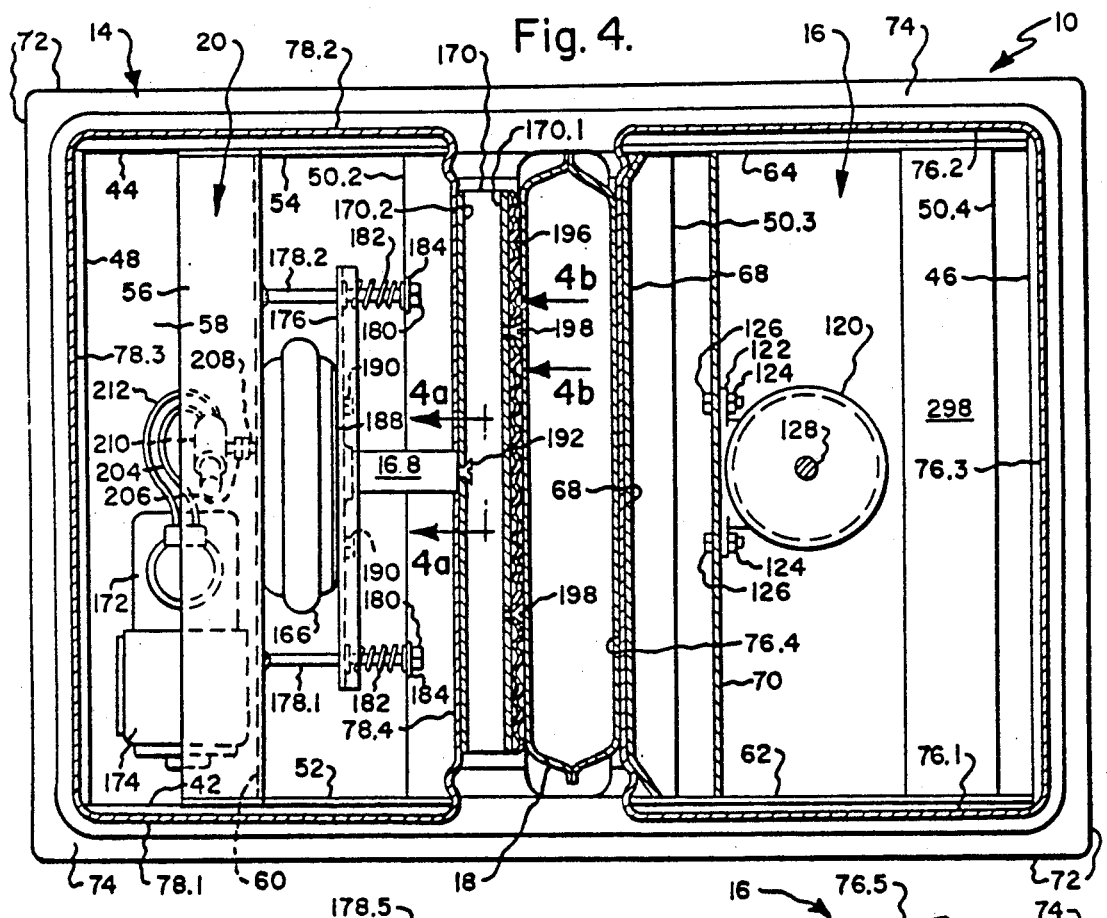
Fig. 4.
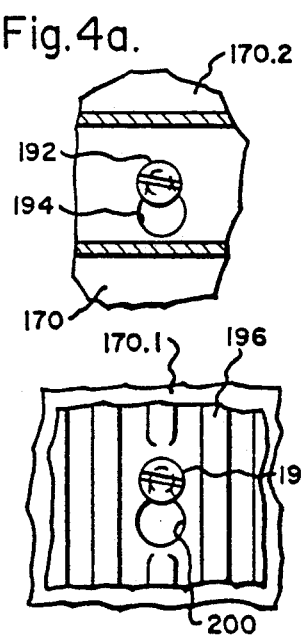
Fig. 4a.
Fig. 4b.
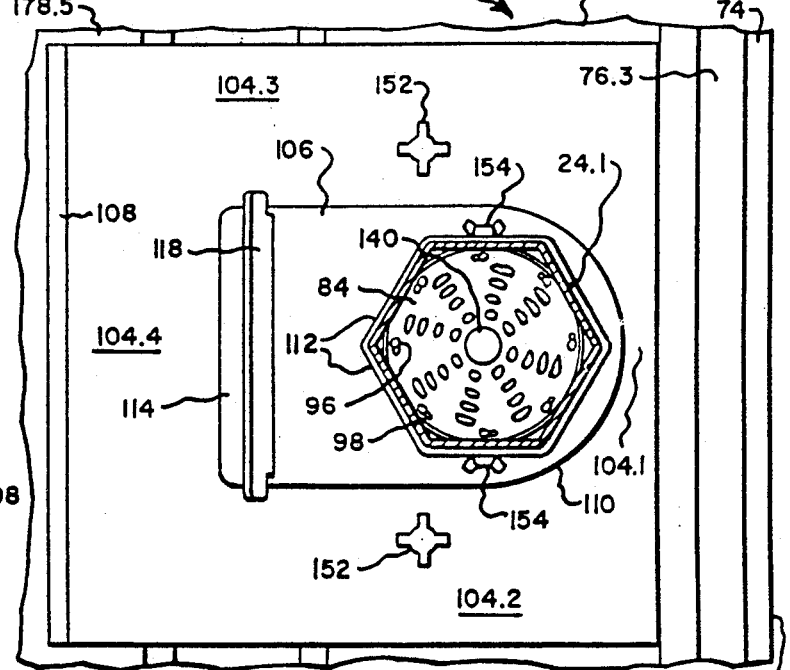
Fig. 5.

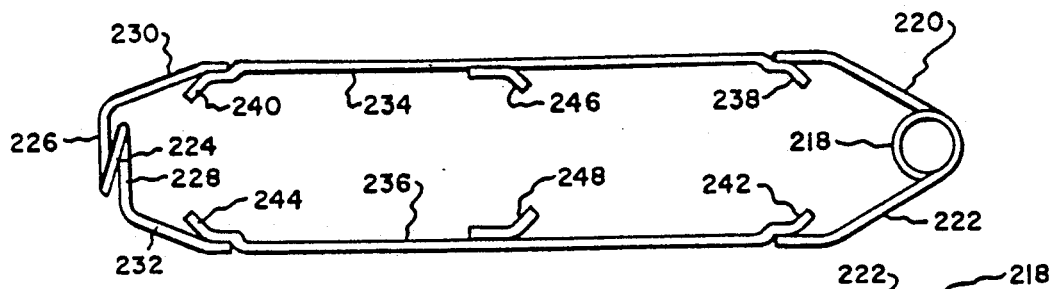
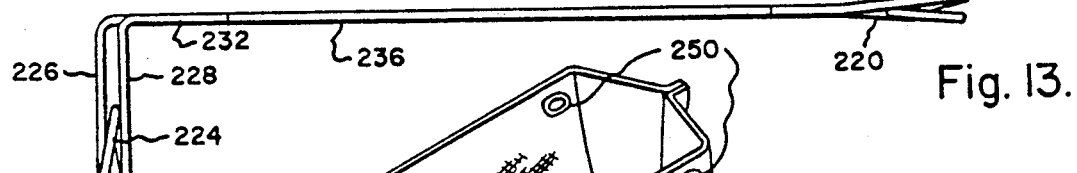
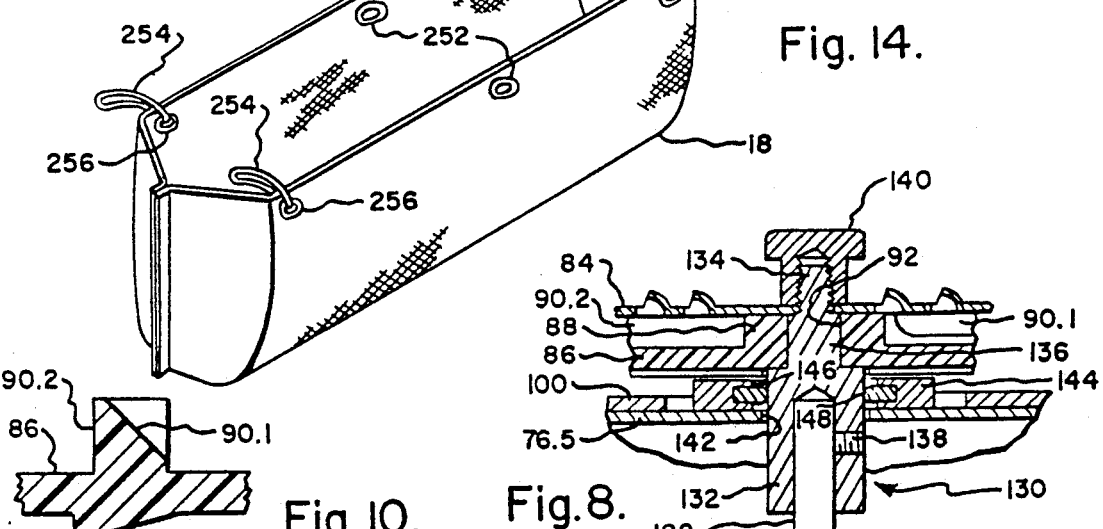
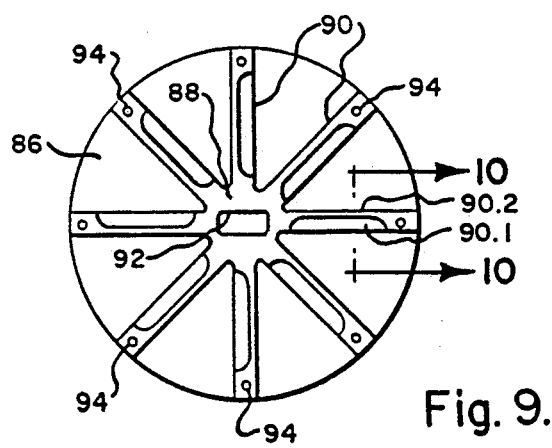
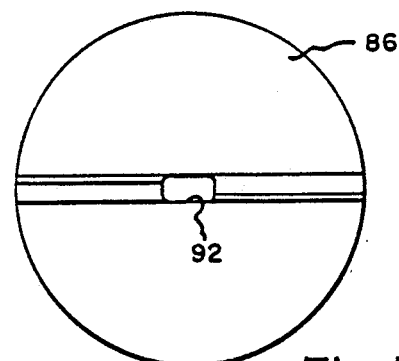

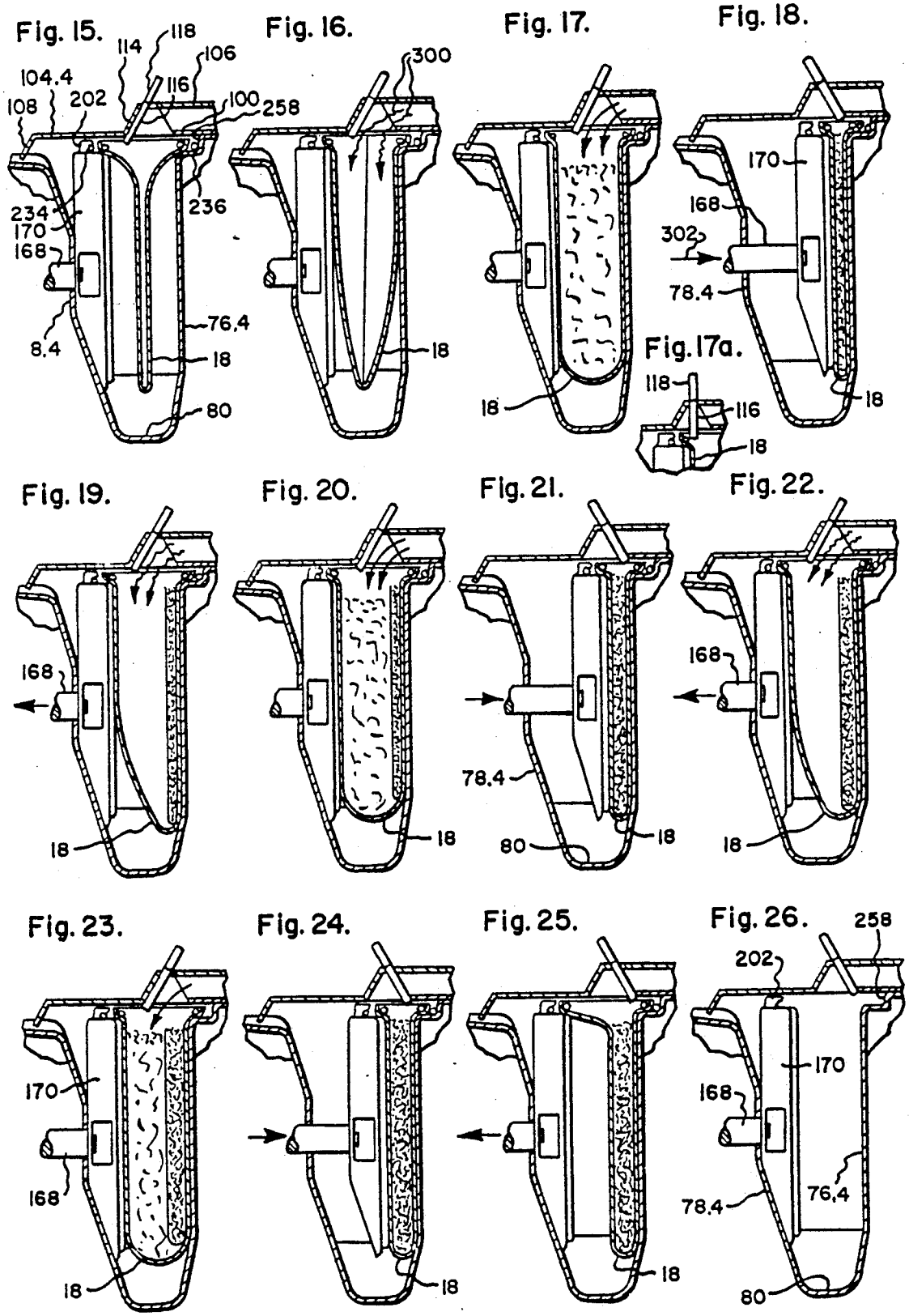

FRUIT AND VEGETABLE JUICE PRESS ASSEMBLY

TECHNICAL FIELD

The present invention relates generally to presses of the type which are used for expressing liquids from vegetables or fruit, and more particularly to a portable lightweight juice press assembly which may be used in supermarkets and the like for expressing juice from fruits and vegetables, which press assembly does not require highly skilled operators and which may be quickly and thoroughly cleaned.

BACKGROUND OF THE INVENTION

Various machines have been developed for extracting juice from vegetables and fruit. In some of these machines, such as for example a citrus juicer, it is relatively simple to express the juice from the fruit. In other machines, it is necessary to first grate or pulverize the fruit into a pulp and then to press it with relatively high pressing forces in order to extract the juice. This is typical, for example, when expressing cider from apples. Thus, it has been known in the prior art to provide a juice press with a device for comminuting the fruit. In the past, it has been proposed to develop such juice presses for use in supermarkets. However, no prior art machines have gained widespread commercial acceptance. This has been due primarily to a number of reasons; the principal reasons being in the difficulty in developing a machine which is easy to operate, relatively compact, and portable, and which can be readily cleaned. One prior art machine is shown in U.S. Pat. No. 2,087,435 issued June 20, 1937. This patent discloses a hydraulic press which is adapted to force fruit and/or vegetables into the face of a cutter which pulverizes the material into small pieces, which material is subsequently pressed for expressing the juice therefrom. With this form of machine, it is possible that the food which is to be pulverized may be contaminated by hydraulic oils. In addition, the form of machine illustrated is very difficult to disassemble for cleaning purposes.

A related machine is shown in U.S. Pat. No. 1,698,613 issued Jan. 8, 1929. In this form of machine an air cylinder is utilized to force a piston 24 into a container of fruit to express juice therefrom. This machine also has the disadvantage in that it is very difficult to clean. Other related prior art is shown in U.S. Pat. Nos. 2,068,013; 2,720,161 and 1,539,161. While such machines have been proposed in the past, up until the present time none have received commercial acceptance in the market place.

OBJECTS AND SUMMARY OF THE INVENTION

It is an object of the present invention to develop a fruit and vegetable juice press assembly which can effectively express juice from comminuted fruit or vegetables, which apparatus may be readily cleaned and which will not contaminate the food being processed therein by motor oils and the like.

It is an additional object of the present invention to provide and apparatus of the type referred to which is relatively easy to operate.

Another object of the present invention is to provide a novel impeller for the processor of the fruit and vegetable juice press assembly of this invention wherein the impeller is capable of forcibly ejecting grated pulp with sufficient velocity to cause it to be slung into a press bag downstream of the processor. It is a further object of the present invention to provide a novel discharge chute which may be readily disassembled for cleaning of the fruit and vegetable juice press assembly of this invention.

It is a further object of the present invention to provide safety interlocks for a fruit and vegetable juice press assembly wherein all guards must be in place prior to the initiation of the operation of the press assembly.

It is a further object of the present invention to provide a novel support for a press bag for use in the fruit and vegetable juice press assembly of the present invention.

It is a still further object of the present invention to provide movable baffle means which are capable of preventing the inadvertent discharge of material from the discharge chute when the processor is not being driven.

It is a further object of the present invention to provide a novel housing assembly for the fruit and vegetable juice press assembly of the present invention wherein the housing assembly encloses the operating motors for the press and processor, which housing assembly may be readily disassembled from the other parts of the apparatus for purposes of cleaning.

It is a further object of the present invention to provide filter paper bag liners for the filter cloth press bag whereby the paper liners may be disposed of at the completion of a pressing cycle.

It is a still further object of the present invention to provide a novel operational sequence for the operation of the fruit and vegetable juice press assembly of the present invention.

The above objects are accomplished by providing an assembly which includes a frame which supports press drive means and food processor drive means. A removable housing is mounted over the drive means. The removable housing including two spaced apart housing portions, a platen, a press bag, and a press bag support being located between the housing portions. A portion of the press drive means extends through an aperture in the sidewall of one of the two housing portions, the platen being removably secured to said portion. A processor is adapted to be removably secured to the top of the other housing portion. The processor includes a two part or clam-shell discharge chute which, during operation of a grater and impeller located within the processor, causes grated pulp material to be discharged into the press bag. A hopper cover and guards to either side of the pressing chamber between the two spaced apart housing portions are provided, which cover and guards must be in place before commencement of the operation of the apparatus. A juice collector is disposed beneath a trough at the bottom of the pressing chamber. Manually engagable start, stop and grind time varying controls are provided, which controls initiate the operation of a controller supported by the frame.

The above details, as well as additional objects and advantages of this invention, will become more apparent after a consideration of the following detailed description taken in conjunction with the accompanying drawings in which a preferred form of this invention is illustrated.

DESCRIPTION OF THE FIGURES

FIG. 4 is a sectional view taken generally along the line 4-4 in FIG. 3.

FIGS. 4a and 4b are views taken generally along the lines 4a—4a and 4b—4b in FIG. 4.

FIGS. 5, 6 and 7 are sectional views taken generally along the lines 5—5, 6—6, and 7—7 in FIG. 3.

FIG. 8 is a sectional view taken generally along the line 8—8 in FIG. 7.

FIG. 9 is a top plan view of the impeller utilized in the apparatus of this invention.

FIG. 10 is a sectional view taken generally along the line 10—10 in FIG. 9.

FIG. 11 is a bottom view of the impeller shown in FIG. 9.

FIGS. 12 and 13 are plan and right side elevational views, respectively, of the press bag support utilized in this invention.

FIG. 14 is a perspective view of the press bag utilized in this invention.

FIGS. 15 through 26 are sectional views through the press bag of this invention and a portion of the press means utilized for pressing the contents of the press bag to express juice therefrom, these views further illustrating an operational sequence utilized during a complete cycle of the juice press assembly of this invention.

DETAILED DESCRIPTION

In General

Figure 1:
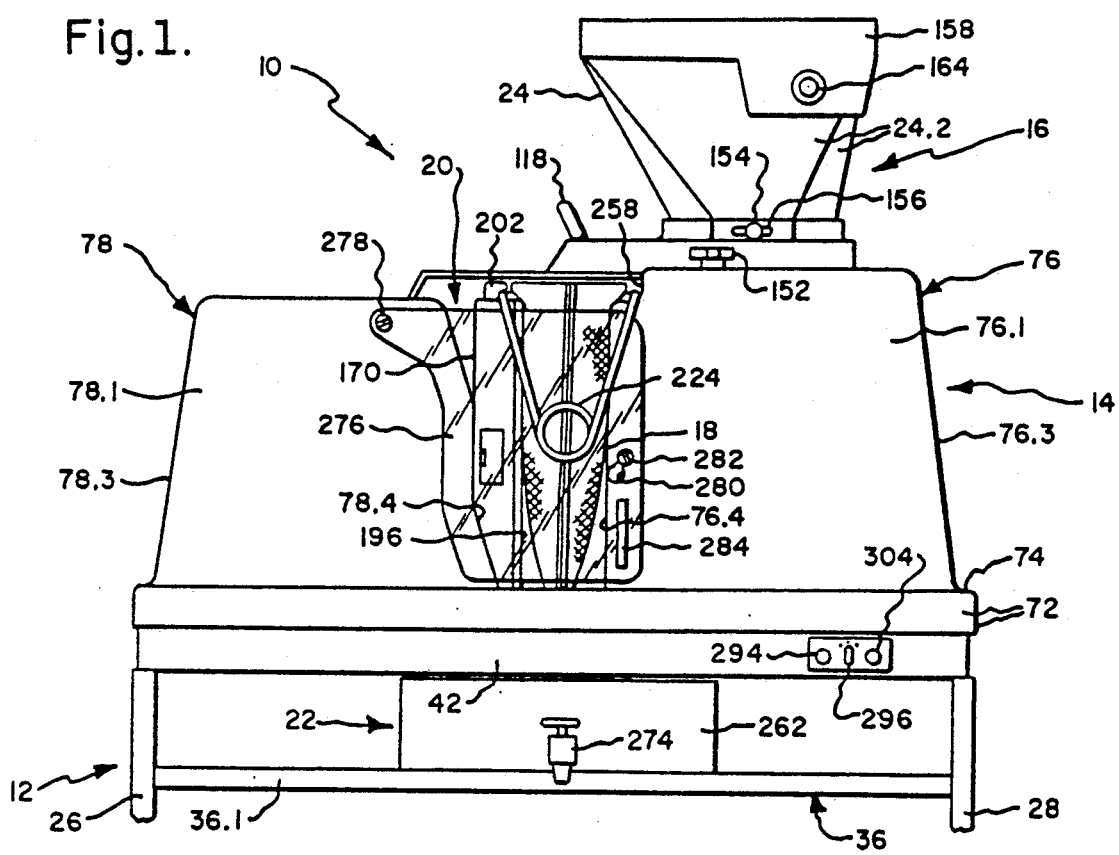
FIG. 1 is a front side elevational view of the fruit and vegetable juice press assembly of this invention, the bottom of the frame not being shown.

The fruit and vegetable juice press assembly of this invention, which is indicated generally by reference numeral 10 includes, as major components thereof, a frame indicated generally at 12, a housing assembly 14 mounted upon the frame, a processor indicated generally at 16, a press bag 18, press means indicated generally at 20 and a juice collector indicated generally at 22. While the operation will be described more fully below, it should be observed initially that during operation of the apparatus of this invention that fruit or vegetables placed within a hopper 24 will be grated by the processor and discharged into the press bag. The press means will engage the press bag to squeeze the pulp within the bag and to express juice from the pulp, the expressed juice being received by the collector 20.

The Frame

Figure 3:
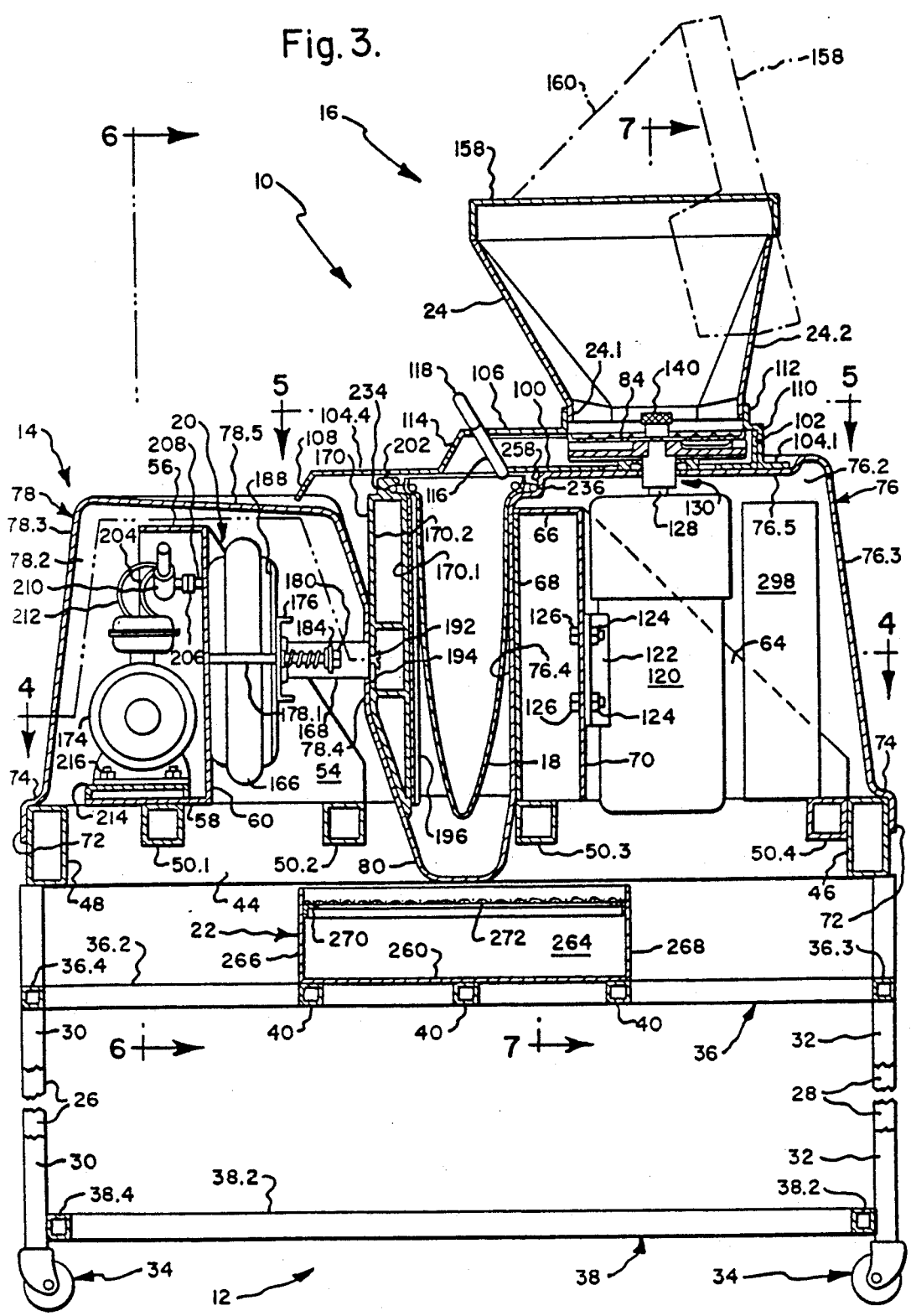
FIG. 3 is an enlarged front side partial sectional view through the fruit and vegetable juice press assembly of this invention.

The frame includes four corner legs, there being a left front vertical or back leg 26, a right front vertical leg 28 and left and right rear or back legs 30, 32, respectively. Each of the legs supports at its lower end thereof a caster wheel assembly 34. The caster wheel assembly may be of the type which may be switched between rolling and non-rolling operation configurations. Upper and lower rectangular bracing frame subassemblies 36, 38, respectively are interconnected to the vertical legs and are welded thereto. The upper rectangular bracing frame assemblies includes front 36.1 and back 36.2 laterally extending frame members which extend between left and right legs, and right 36.3 and left 36.4 fore and aft extending members which extend between front and rear legs. The lower bracing frame assembly is also formed with front, back, right, and left members 38.1, 38.2, 38.3, and 38.4, respectively. A panel, not shown, may be supported upon the lower rectangular bracing frame assembly 38 to provide a shelf. In addition, the upper bracing frame is provided with a plurality of fore and aft extending collector support members 40 which are welded at either end to the corresponding front and rear frame members. Supported upon the upper ends of the front and rear legs are laterally extending front and rear mainframe members 42, 44, respectively. Extending between these members are right and left fore and aft mainframe members 46, 48. A plurality of additional fore and aft frame members 50 may also be welded to the front and rear laterally extending mainframe members, these additional members being indicated by the reference numerals 50.1, 50.2, 50.3, and 50.4. Supported by the left additional frame members 50.1 and 50.2 are upwardly extending front and rear triangular frame members 52, 54, respectively (FIGS. 3 and 4). Extending between these frame members are additional upper and lower frame members 56, 58 and a fore and aft extending vertical frame member 60. These last three frame members 56, 58 and 60 support the press means in a manner which will be more fully discussed below. The frame means additionally includes right front triangular frame members and right rear triangular frame members 62, 64 which are supported on the fore and aft frame members 50.3 and 50.4. The triangular frame members 62, 64, in turn support a welded box frame assembly which includes an upper frame member 66 and left and right vertical frame members 68, 70. This box frame assembly 66, 68 and 70 supports the processor 16 in a manner which will be more fully brought out below.

Housing Assembly

Figure 6:
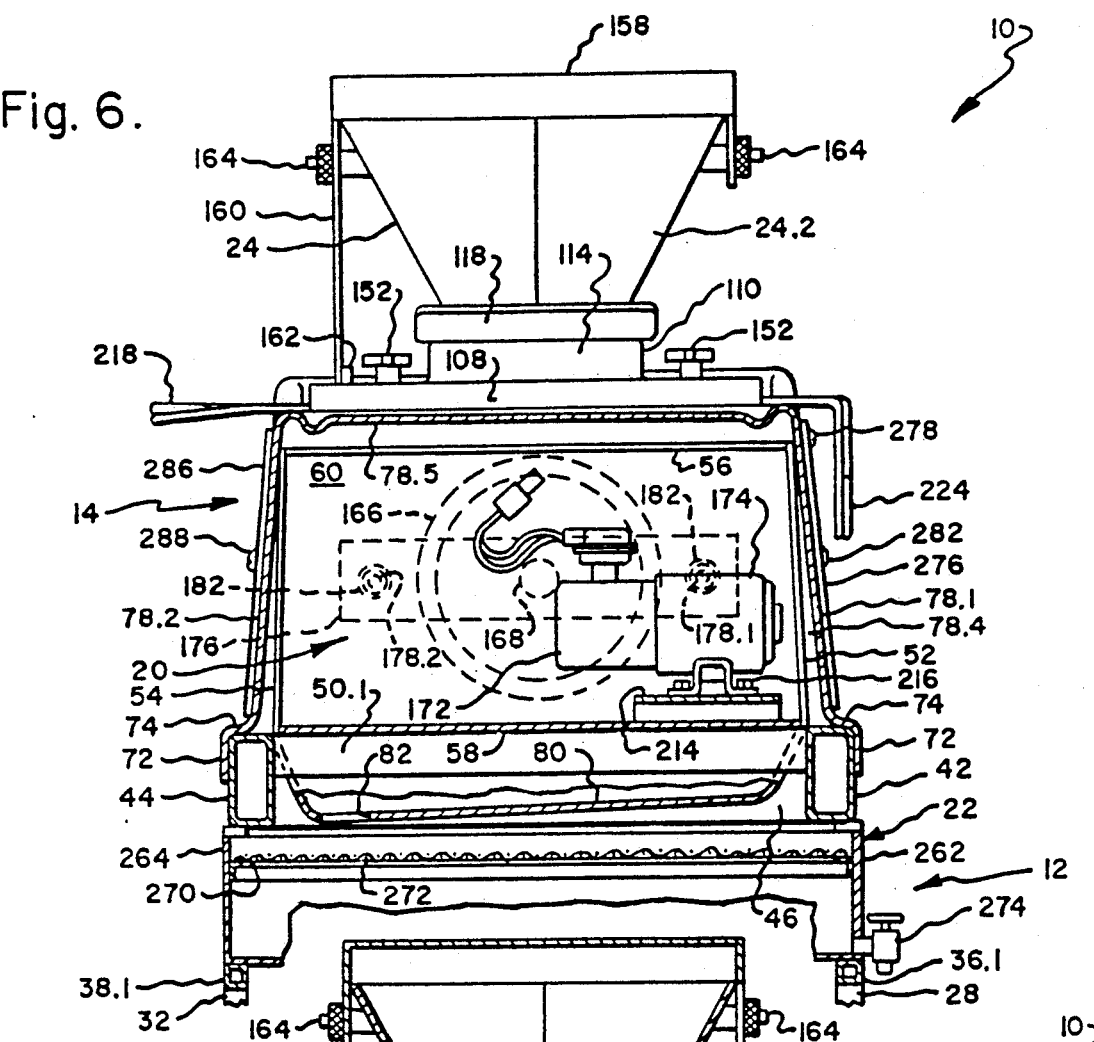

Both the drive means and press means should be isolated from the food to be processed. Therefore, it is necessary to provide a housing which will ensure that lubrication oil, electrical insulation, and the like used with either the processor drive means or the press operating means does not contaminate the food being processed. As the housing will be in contact with the food it should be easy to disassemble. Accordingly, a unitary housing assembly (14) is provided which housing assembly is formed from a single piece of fiberglass reinforced plastic, the side of the housing assembly adjacent the frame being provided with a fire resistant gel coat, and the exterior portion of the housing assembly which may be contacted by the food being provided with a food compatible gel coat. The housing assembly consists of a skirt portion 72 which is adapted to be disposed about and in contact with the outer periphery of the frame as defined by the main frame members 42, 44, 46 and 48. An inwardly extending portion 74 which is adapted to rest upon the mainframe members 42 through 48 extends inwardly from the upper edge of the skirt portion 72. Extending upwardly from the inwardly extending portion 74 are first and second spaced apart housing portions 76, 78. The first housing portion 76 is disposed about a portion of the process drive means and has front and rear generally vertically extending sidewalls 76.1 and 76.2, respectively, a right-hand inclined sidewall 76.3, a left-hand vertically extending sidewall 76.4 and an upper horizontal portion 76.5. Two spaced apart upwardly extending studs are secured to the horizontal portion 76.5. The second housing portion is also provided with front, rear, left inclined, right vertical, and upper horizontal walls 78.1, 78.2, 78.3, 78.4 and 78.5, respectively. Finally, the housing assembly 14 is provided with an integral trough which extends between the lower ends of the adjacent vertical walls 76.4 and 78.4, the trough also extending inwardly from the inwardly extending portion 74. In this connection it should be noted that the inwardly extending portion 74 at the area of the trough is sufficiently wide so that it overlies the entire width of each of the front and rear mainframe members 42, 44 thus permitting the trough to assist in aligning the parts into a gravity supported position. As can best be seen from FIG. 6 the trough is provided with an aperture 82. To assemble the housing assembly onto the frame, it is only necessary to drop it into place. To disassemble after the processor has been disassembled, it is only necessary to lift it off.

The Processor

The processor includes a grater 84, which grater may be a conventional circular cheese grater, the grater in turn being rigidly secured to an impeller. The impeller includes a circular disk 86 provided with an integral upwardly extending hub 88 and a plurality of vanes 90 which extend radially outwardly from the hub 88. The hub 88 is provided with a drive aperture 92, which aperture may be generally rectangular in cross section as shown in FIG. 9. Each of the vanes 90 is provided with an angled leading edge 90.1 between the ends of the vane and a vertically extending training surface 90.2. The radial outer ends of each of the vanes is not provided with the angled surface 90.1 but is of rectangular cross section, each of the ends being provided with a threaded aperture 94, which apertures are adapted to receive screws 96, the screws passing through keyhole apertures 98 on the periphery of the grater 84 to hold the grater on the impeller.

The processor further includes a discharge chute, which discharge chute is formed by a two-part clam shell assembly. Thus, the discharge chute includes a lower channel member which is adapted to underlie the impeller and cheese grater. The lower channel member includes a lower horizontal surface 100 and a vertically extend horse-shaped rim 102. The discharge end of the lower channel member, which is disposed between the ends of rim 102, is disposed above the press bag 18. Disposed above the lower channel member is an upper channel member which maintains the lower channel member in place when assembled, the upper channel member is formed from a single piece of food grade plastic and includes a lower horizontal portion 104 and an upper generally centrally located upper horizontal portion 106. The right-hand portion 104.1 of the lower horizontal portion, and as well as the front and rear portions 104.2 and 104.3 are adapted to lie in contact with the horizontal portion 76.5 of the first housing portion. The left-hand portion 104.4 of the lower horizontal portion overlies the opening to the press bag 18 and, at its left-hand end is provided with a downwardly extending lip 108 which is adapted to contact the top horizontal surface 78.5 of the second housing to support the lower horizontal portion. A generally vertical portion 110 extends from the lower horizontal portions 104.1-104.4 to the upper horizontal portion 106, the vertical portion 110 being adapted to be disposed in contact with the vertical walls 102 of the lower channel member. A hexagonal opening is defined in the upper horizontal portion 106 by vertically extending walls 112. The upper horizontal portion 106 extends to the left of the lower channel member a sufficient distance to permit pulp to be discharged by the impeller to flow through the opening and downwardly into the press bag 18. In order to facilitate downward movement the left-hand end wall 114 is inclined as best shown in FIG. 3. Spaced slightly to the right of the wall in the upper horizontal portion 106 is a fore and aft extending slot (no number) which receives the lower end 116 of a baffle, the upper end 118 of the baffle, which is of greater width than the lower end, resting upon the upper surface of the upper horizontal portion 106.

The processor is driven by processor drive means which includes an electric motor 120 which is provided with a saddle bracket 122 which is suitably fastened to the vertical frame member 70 by nuts and bolts 124, 126. The motor is provided with an arbor shaft 128 upon which is mounted a drive shaft indicated generally at 130. The drive shaft (FIG. 8) is provided with a first cylindrical portion 132, an upper threaded portion 134, and an intermediate drive portion 136 which may be rectangular in cross section in the same manner as is aperture 92. The drive shaft 130 is held in place on the arbor shaft 128 by means of a set screw 138 which passes through a suitable threaded aperture in the first cylindrical portion 132. As can best be seen from FIG. 8 the intermediate drive portion 136 passes through the aperture 92 in the hub 88 and underlies a central hub portion of the cheese grater. The cheese grater is in turn provided with a suitable aperture capable of receiving the upper threaded portion 134 and the parts are secured together by means of a threaded element 140 which may be screwed onto the threaded portion 134 to hold the parts together.

In order to properly seal the drive motor and other electrical components disposed within the first housing from the other components of the processor which are placed above the first housing portion 76, it is necessary to seal the shaft 130. To this end, a seal assembly, best shown in FIG. 8, is mounted upon the top horizontal portion 76.5 about a centrally located aperture 142. The seal assembly consist of an annular support member 144 which is secured to the top of the horizontal portion 76.5 in any conventional manner, such as by adhesives, welding, etc. The support member 144 is provided with an internal circumferential groove within its central aperture 146, which groove receives a ringlike resilient sealing member 148. As can be seen the seal assembly is adapted to be received within an aperture 150 of the horizontal portion 100 of the lower channel member. When the housing assembly is placed onto the frame it is of course necessary that the drive shaft 130 extend through the seal 148.

Figure 7:
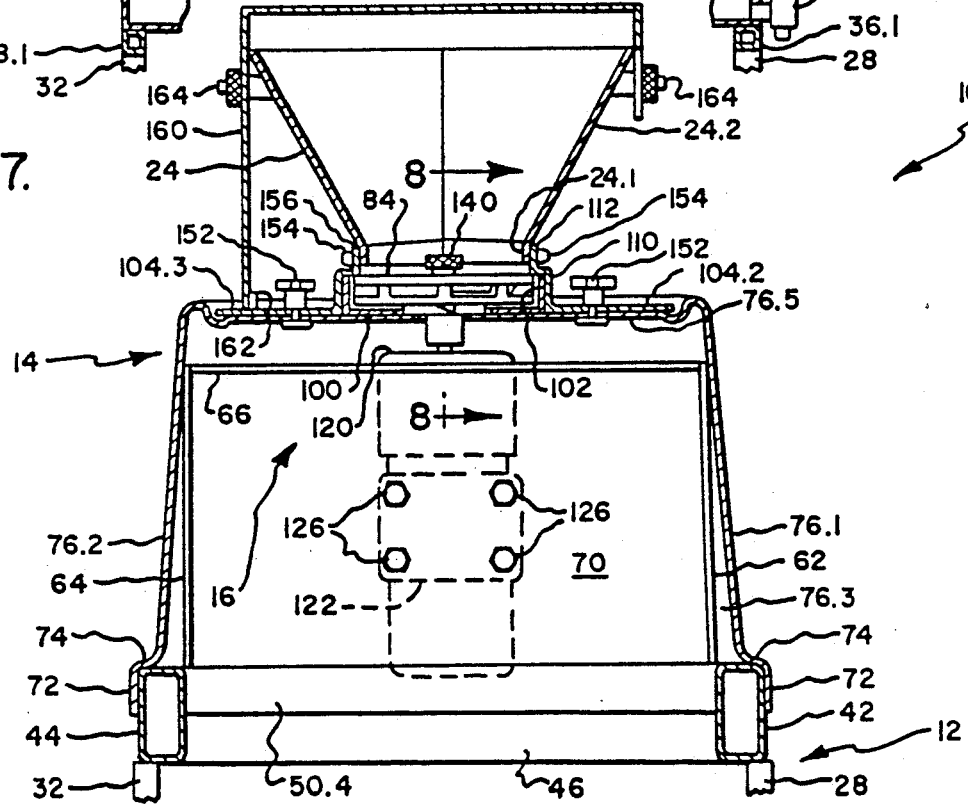

To assemble the remaining components of the processor onto the housing assembly and drive shaft, it is necessary to first place the lower channel member 100, 102 in position with its discharge extending over the press chamber. The impeller and cheese grater subassembly, which have previously been assembled together, are then placed over the drive shaft with the drive aperture 92 of the hub of the impeller engaging the intermediate drive portion 136 of the drive shaft 130. The parts are then held together by screwing the threaded element 140 onto the threaded portion 134 of the drive shaft. Next the upper portion of the discharge housing is placed into position. To this end the front and rear horizontal portions 104.2 and 104.3 are provided with suitable apertures which receive the studs 77, the upper portion of the discharge housing then being secured in place by placing threaded elements 152, in the form hand nuts, onto the studs and turning them down to the assembled position best shown in FIG. 7. When the upper clam shell part of the discharge chute is secured in place the lip 108 will be resting upon the horizontal portion 78.5 of the second housing. The lower end of the baffle 116 is now inserted through the slot of the upper horizontal surface 106. The hopper 24 is now assembled onto the upper channel member and to this end it should be noted that the hopper includes a lower hexagonal opening 24.1 and upwardly and outwardly extending sidewall portions 24.2. Thus, the hexagonal bottom portion 24.1 is received within the hexagonal walls 112 until the outwardly extending sidewalls 24.2 contact the marginal upper edge. The hopper is now secured in place by inserting winged studs 154 through suitable apertures 156, which studs are received by suitable threaded apertures in the bottom 24.1 of the hopper. The hopper is of sufficient size that it may receive enough fruit or vegetables to be processed by a complete cycle of the juice press assembly of this invention. The hopper is closed by a hopper cover 158 which may be of any suitable configuration, such as the configuration illustrated in the drawings, the hopper cover being provided with a hopper cover extension 160 which, as can be best seen from FIG. 2, extends all the way down to the top surface of the upper horizontal portion 106 of the upper channel member. The lower end of the extension 160 is provided with a magnet 162. The cover may be moved from the assembled position shown in FIG. 1 to an open position shown in phantom lines in FIG. 3. When the hopper cover is moved between its open and closed position, it will pivot about pivots 164. The function of the magnet 162 will be discussed alone.

The Press

The press means 20 include, as principal components thereof, an air bag 166, a ram 168, a platen 170, a compressor 172, and compressor motor 174. The air bag 166 is supported upon one side of the vertical frame member 60. On the other side the air bag is interconnected with a transversally extending slidable support beam 176 which is slidably supported upon spaced apart horizontal support rods 178.1 and 178.2, which rods are welded or otherwise rigidly secured to the vertical plate 60. The end of each of the rods 178 spaced away from the vertical plate 60 is threaded and receives a nut 180. A spring 182 and washer 184 are disposed about each rod 178 between the nut 180 and the beam 176, the springs normally biasing the beam as well as the air bag 166 towards the vertical plate 60. In order to facilitate the securement of the air bag 166 to the support beam 176 a disk like plate 188 is adhesively or otherwise rigidly secured to the bag 166, the plate 188 carrying outwardly extending studs (not shown) which project through suitable apertures in the beam 176, the plate then being secured to the beam by nuts 190 which engage the studs carried by the plate 188. The ram 168 has its rear or left-hand end (seen from FIG. 3) rigidly secured to the beam 176, the ram extending horizontally away from the bag, with an outer end of the ram passing through a suitable bearing aperture in the generally vertical wall 78.4 of the second housing portion 78. The outer end of the ram is adapted to be releasably connected to the platen 170 and to this end a suitable fastener 192 is carried by the outer end of the ram. As shown in the drawing the fastener 192 may simply be a screw which is not fully turned into the ram so that a portion of the screw shank is exposed between the head of the screw and the end of the ram. The head of the screw may in turn be passed into a keyhole opening in the platen with the platen then being dropped into the suitable mating position.

As can be seen best from FIG. 3 the vertical wall 78.4 is suitably contoured so that when the platen 170 is assembled it will be held in proper position when the ram 168 is in its retracted position as shown in FIG. 3. The platen may be a weldment or a casting. The platen is provided with a suitable vertical working surface 170.1. In order to facilitate the squeezing of pulp juices it is desirable that at least one of the surfaces contacted by the press bag 18 be provided with a washboard-like configuration. To this end it may be desirable to provide the surface 170.1 with such a washboard-like configuration. Alternatively, a removable panel 196 may be secured to the vertical face 170.1 of the platen by means of fasteners 198, comparable to the fastener 192, which fasteners 198 pass through associated keyhole slots 200 in the removable panel. It should be obvious that if the air bag would be expanded that the platen would be moved from the left-hand position, shown in FIG. 3, to a right-hand position, such as that shown in FIG. 18. Similarly, if the air were to be vented from the bag 166 the action of the springs would then return the bag to the position shown in FIG. 3 where, in the left-hand side 170.2 of the platen will engage the right-hand side of the vertical wall 78.4. In order to provide a suitable support for the press bag support means (which will be described below) the upper end of the platen 170 is provided with a projection 202 in the form of an inverted L, the L-shaped projection 202 forming a groove open to its right-hand side as shown in FIG. 3.

In order to fill the bag the compressor 172, when driven by the motor 174 will discharge air through air line 204, which air line is suitably coupled by coupling 206 to a nipple 208 which extends through a suitable aperture in the vertical wall 60. A relief valve 210 is associated with the air line 204. In addition, a further air line 212 extends from the body of the relief valve back to a portion of the compressor 170. The motor and compressor are so selected that when the motor is operated air pressure will only slowly build up within the air bag, not obtaining full system pressure, as determined by the relief valve, for an appreciable length of time, such as for example, 2 minutes. Therefore, if the air compressor is only operated for a short period of time, for example 30 seconds, full system pressure is not achieved, the pressure for example only abtaining 50% of full system pressure. Thus, by varying the time the compressor is driven, it is possible to vary the pressure applied to the pulp within the press bag during a pressing operation, provided that the system does not run long enough to build up to relief valve pressure. At the completion of an operation a valve (not shown) is opened to permit the discharge of air from the bag 166 through line 212, thereby permitting the springs 182 to return the bag 166 to its initial operational position as shown in FIG. 3. The motor 174 is provided with a suitable saddle-type motor mount which is in turn secured to a motor support 214 welded or otherwise rigidly secured to the lower frame member 58, the parts being secured together by suitable fasteners 216.

Press Bag Support

The press bag support means is best illustrated in FIGS. 12 and 13 and consists of essentially of a spring wire framework. Thus, at the rear side of the press assembly of this invention a spring wire is provided having a central coil portion 218, and left and right outwardly and forwardly extending arms 220, 222, respectively. At the front side of the support assembly a similar spring wire is provided this wire having a central coil 224, left and right upwardly extending arms 226, 228 and extensions at right angles to the upwardly extending arms, the extensions 230 and 232 being comparable to the arms 220, 222, respectively. Left and right intermediate lengths 234, 236 are provided, these intermediate lengths also preferably being formed of spring wire and having the configuration best illustrated in FIG. 12. Thus, the left intermediate length 234 is provided with rear and front hook ends 238, 240 which are suitably welded to the ends of corresponding elements 220, 230, respectively. Similarly, the right-hand intermediate length is also provided with rear and front hook ends 242, 244 which are also suitably welded to the ends of elements 222, 232, respectively. Left and right intermediate hooks 246 and 248 are welded to intermediate portions of the intermediate lengths 234 and 236. When the parts are assembled in the manner illustrated in FIGS. 12 and 13, a wire framework is provided wherein the intermediate lengths 234 and 236 are normally spring biased to the open position illustrated in FIG. 12. However, the intermediate lengths may be moved closer to each other by merely compressing the wire arms 220, 222 and 230, 232 together. However, if the compressive force is released, the intermediate lengths 234 and 236 will resume their spread open position illustrated in FIG. 12.

The press bag 18 is formed from a single length of filter cloth material and has its side seams sewn together in the manner best illustrated in FIG. 14 to provide a bag which has, in its normal operating position, an open upper end and a lower closed end. A plurality of grommets are mounted in the sides of the bag near the upper end. The rear and intermediate grommets 250, 252 are adapted to be hooked over the rear hooks 238, 242 and intermediate hooks 236, 248, respectively. Resilient means in the form of rubber or rubber-like bands 254 are secured to the forward grommets 256. When the press bag 18 is assembled onto its support, the rear and intermediate grommets 250, 252 will be engaged by the rear and intermediate hooks 238, 242, and 246, 248, respectively; and the resilient bands 254 will be hooked over the front hooks 240, 244 to securely hold the press bag onto the press bag support means. The press bag support means is now positioned between the first and second housing portions 76, 78 above the trough 80 with the right-hand side of the press bag support, namely the right intermediate length 236 being supported upon a notch or cutout 258 between the vertical left sidewall 76.4 and the top sidewall 76.5. The left-hand fore and aft extending member 234 is received within the notch formed between the L-shaped projection 202 and the principal body portion of the platen 170. The assembled position of the parts when the platen is in its standby position is best illustrated in FIG. 3.

Juice Collector

The juice collector in the embodiment illustrated consists of a rectangular pan-like container having a bottom 260 and vertically extending sidewalls which include front, rear, left, and right sidewalls 262, 264, 266, and 268, the sidewalls and bottom wall all being formed of a suitable food grade material such as stainless steel. Near the top of the juice collector is an inwardly extending flange 270 which supports a removable screen 272. Juice expressed from the pulp within the filter bag 18 will flow into the trough 80 and then through the aperture 82 onto the top of the screen 272. The screen 272 will act as a secondary filter to remove any solid material that has passed through the sidewalls of the press bag, filtered juice then flowing into the container or collector 22. The front sidewall 262 of the container is provided a suitable aperture which receives a discharge spigot 274. Juice from within the collector may be withdrawn either by single serving portions into paper cups or the like, or alternatively may be used to fill jugs for subsequent resale.

Press Chamber Shields

As the apparatus of the present invention is designed to be utilized in areas of a supermarket or the like which are accessible to the public, it is necessary to provide safety shielding to prevent inadvertent injury to the public, as well as to the operators of the device itself. To prevent contact with the processor, the hopper is provided with the cover 158. To prevent contact with the platen, shields are placed to either side of the press chamber. Thus, on the front of the machine (FIG. 1) a clear plastic shield 276 is mounted, the shield 276 being hinged to the left-hand housing 78 by pivot 278. The right-hand side of the front shield is provided with a keyhole opening 280 which is adapted to receive a catch in the form of a headed screw or the like 282. In addition, the front shield 276 carries a magnet 284 for purposes which will be explained later. A rear shield 286 (FIG. 2) is similar to the front shield but is supported by two spaced apart fasteners 288 which are received by two spaced apart keyhole openings 290. This shield also carries a magnet 292. It can be seen that this shield can be disassembled by shifting it upward slightly from the position shown in FIG. 2 and then passing the enlarged heads of fasteners 288 through the larger opening portion of the keyhole openings 290.

Operation

Figure 2:
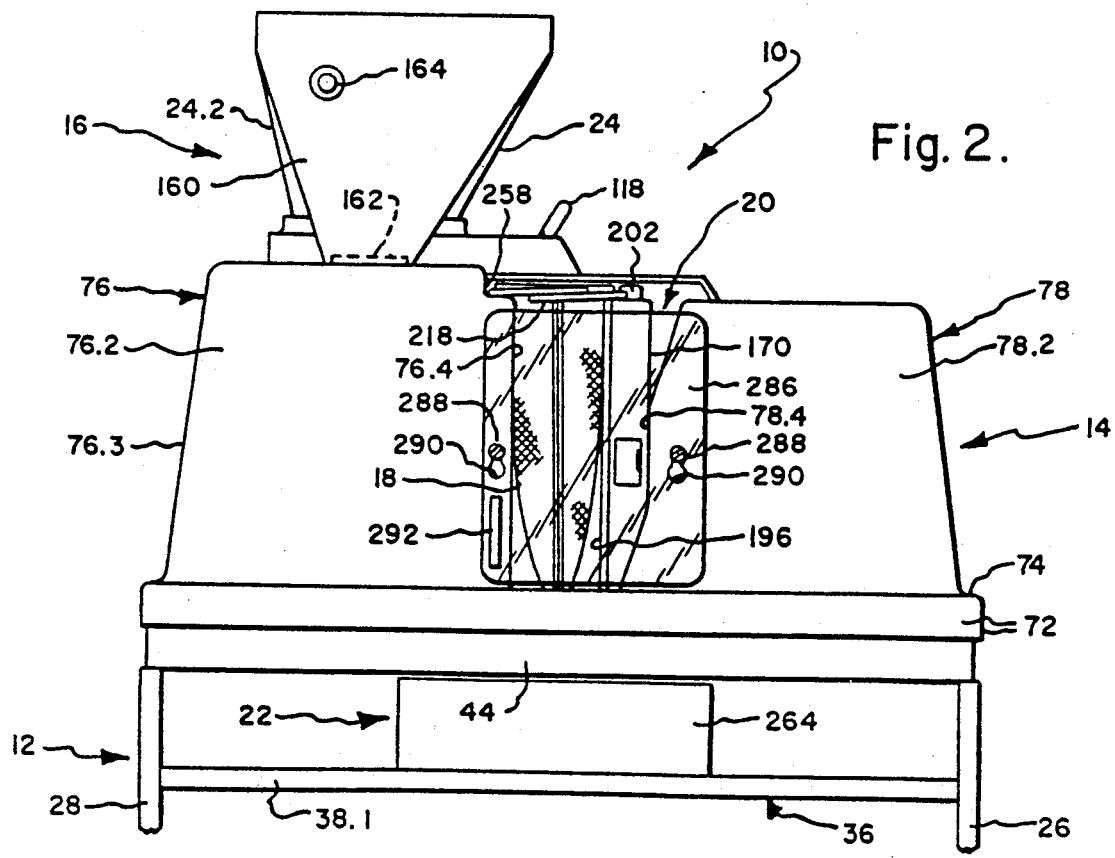
FIG. 2 is a rear view of the press assembly shown in FIG. 1.

After the apparatus of this invention has been assembled to the position indicated in FIGS. 1 and 2 and in full lines in FIG. 3, it is necessary to load the machine and then initiate the operation. To load the machine the hopper cover 158 is swung from its full line position to its open position shown in phantom lines in FIG. 3. The hopper is now filled with the vegetables or fruits which are to have their juice extracted. The hopper is so designed that it can receive a sufficient load of fruit or vegetables to permit the press bag to be substantially filled three separate times. Once the hopper has been filled, the cover must be swung back to its closed position to put the magnet 162 adjacent a magnet-sensing switch (not shown) disposed within the housing 76. Before commencing operation, the operator will then check to determine that both the front and rear shields are in their proper operational position, which position is illustrated in FIGS. 1 and 2, with their associated magnets 284 and 292 being in their proper operational position. When these magnets are in their proper operational position, they will also be associated with magnet-sensing switches located within the housing 76. Other magnets and magnet-sensing switches may also be utilized in the practice of this invention. Thus, for example, a magnet may be associated with the upper channel member 102 in such a manner that when the channel member is properly installed the magnet carried by the upper channel member will be placed a juxtaposed position with respect to a magnet-sensing switch carried within the housing 76.

When the parts have been properly assembled and the hopper has been loaded it is then only necessary for the operator to commence operation by selecting the cycle time and then pushing the start button 294. The cycle time is varied in accordance with the hardness of the fruit because soft fruits require less grating time than hard fruits or vegetables. Thus, for example grapes require very little grating time whereas hard vegetables like carrots require a longer period of time. Fruits, such as apples, only require a moderate length of time. In connection with this it has been found that three-position switch usually gives good results with all types of fruits and vegetables, the operator only selecting one of three positions with the timer switch 296. Once the timer switch has been selected to either soft, medium, or hard and the start button 294 has been pushed the entire operation will be controlled automatically by a controller which is mounted within controller housing 298. The operation is commenced if all of the magnet-sensing switches are in closed positions, which positions will be achieved when the magnets 284, 292, as well as others, are placed in the proper positions. If the magnets are in their proper position, the processor will then be caused to be rotated for a fixed length of time, depending upon the setting of switch 296. During the operation of the processor, the fruit or vegetable will be grated and the pulp will be impelled in the direction of the arrows 300 (FIG. 16) into the press bag 18 until the press bag is substantially filled to the level indicated in FIG. 17. Initially though it should be noted that before the operation is commenced that the baffle 116, 118 is in the position shown in FIG. 15, but that when the impeller commences to rotate and discharge pulp in the direction of the arrows 300 that the baffle 116, 118 will be shifted by the thrown pulp to its other position shown in FIG. 16. The fill is determined solely by the setting of the timer switch 296, the processor running for a shorter length of time for soft fruit and for longer lengths of time for hard fruit, each length of time being initially established to set that period of time necessary to fill the press bag to the level indicated for the type of fruit being processed. At the completion of the first processing operation the controller will then cause, the compressor motor 174 to start operation to initiate operation of the compressor 172. As the compressor 172 is operated air will be slowly introduced into the air bag 166 causing the ram 168 to be shifted to the right to move the platen in the direction of the arrow 302 (FIG. 18). As the platen commences movement, the top edge of the bag 18 or L-shaped projection 202 will catch the lower most end of baffle 116 causing the baffle to be shifted back to its closed position as indicated in FIGS. 17A and 18. This will prevent any fruit from falling behind the press bag. The compressor motor will be run by the controller for a suitable length of time, for example 30 seconds, to press most of the juice from the pulp within the press bag. At the completion of this operation, the operation of motor 176 will be ceased and air will be permitted to vent from bag 166 thereby letting springs 182 to return the press bag 166 back to its normal initial operating position shown in FIG. 3. After this first sequence of operational steps has been completed, the controller within the control housing 298 will then cause a second operation of the processor, a second operation of the press, and then a third operation of the processor followed by a third operation of the press, these additional steps being indicated in FIGS. 19 through 24. The final pressing step will, however, be for a substantially longer time than the first two processings steps permitting the pressure within the air bag to achieve relief pressure to thereby extract as much possible juice from the pulp within the bag. At the completion of the final pressing step, the platen will be retracted (FIG. 5), and then the press bag and press bag support means are removed from within the apparatus of this invention to permit the pulp within the bag to be disposed of. To this end it is only necessary to raise the front shield 276 and to slide the press bag and press bag support means laterally outwardly of the machine to permit the discharge of the pulp. If the same type of material is to be run again, it is then only necessary to reassemble the parts for the next operation. However, if a different type of fruit or vegetable is to be utilized in a succeeding press operation it is then necessary to partially disassemble the machine so that all parts can be thoroughly cleaned to prevent the fruit of one juice or vegetable from contaminating the juice of another fruit or vegetable. For cleaning purposes it is only necessary to remove the processor 16, the platen 170, press bag 18, and its support and the housing assembly 14. As can be seen from the above description, this can be easily and quickly done without the use of tools.

It has been found that when pressing extremely soft fruits, such as for example grapes, that it may be desirable to utilize a paper filter bag (not shown) within the press bag. If a filter bag is used, it will be disposed of at the completion of one operational cycle.

The machine will stop operating at the completion of the operational cycle initiated by pushing the start button 294. However, in the event that the operator desires to stop the operation prior to that point in time, a stop button 304 is provided.

While a preferred structure in which the principles of the present invention have been incorporated is shown and described above, it is to be understood that widely differing means may be employed in the broader aspects of this invention. Accordingly, this invention is intended to embrace all such alterations, modifications, and variations which fall within the scope and spirit of the appended claims.

What is claimed is:

1. A fruit and vegetable juice press assembly comprising:
 a frame;
 a first housing removably supported on the frame;
 a fruit and vegetable processor removably mounted on the first housing, the processor including a grater rotatable about a generally vertically extending axis, an impeller disposed below the grater and also rotatable about said axis, the impeller including a circular disk having a plurality of radially extending vanes on its upper surface, and a discharge chute associated with the impeller and through which grated fruit and vegetables may be discharged, the grater being secured to the radially extending vanes, and wherein the impeller includes an upwardly extending hub which supports a central apertured portion of the grater, the hub being provided with a drive aperture;

a hopper mounted above the processor and in communication with the grater;

a press bag having open and closed ends;

press bag support means removably supporting the press bag with its open end in communication with the discharge chute;

a juice collector supported by the frame below the press bag;

drive means for driving the processor to cause fruit and vegetables within the hopper to be grated and impelled through the discharge chute into the press bag, the drive means including a motor mounted within the first housing, a drive shaft extending from the motor upwardly through the housing and into and through the hub of the impeller and the central portion of the grater, the drive shaft including a first cylindrical portion, an upper threaded portion and an intermediate drive portion received in driving connection within the drive aperture in the hub of the impeller, and the drive means further including a threaded element which engages the threaded portion of the shaft to hold the grater and impeller on the drive shaft;

press means supported by the frame for pressing the press bag to squeeze juice from the grated fruit and vegetables which have been impelled into the press bag by the processor, the squeezed juice flowing by gravity from the press bag to the collector; and control means mounted on the frame for controlling the functions of the drive means and the press means.

2. A fruit and vegetable juice press assembly comprising:

a frame;

a first housing removably supported on the frame;

a fruit and vegetable processor removably mounted on the first housing, the processor including a grater rotatable about a generally vertically extending axis, an impeller disposed below the grater and also rotatable about said axis, the impeller including a circular disk having a plurality of radially extending vanes on its upper surface, and a discharge chute associated with the impeller and through which grated fruit and vegetables may be discharged;

a hopper mounted above the processor in communication with the grater;

a press bag having open and closed ends;

press bag support means removably supporting the press bag with its open end in communication with the discharge chute;

a juice collector supported by the frame below the press bag;

drive means for driving the processor to cause fruit and vegetables within the hopper to be grated and impelled through the discharge chute into the press bag, the drive means including a motor mounted within the first housing;

press means supported by the frame for pressing the press bag to squeeze juice from the grated fruit and vegetables which have been impelled into the press bag by the processor, the squeezed juice flowing by gravity from the press bag to the collector;

control means for controlling the operation of the drive means and the press means; and a hopper cover which is pivotally secured to the hopper for movement between hopper open and hopper closed positions, the hopper cover having an extension which is disposed adjacent the housing when the hopper cover is in its closed position, the extension carrying a magnet, and wherein the control means includes a hopper cover magnet sensing switch which is located on the inside of the housing at a location in proximity to the magnet when the hopper cover is in its closed position, the control means preventing the operation of the drive motor unless the magnet is sensed by the magnet sensing switch.

3. A fruit and vegetable juice press assembly comprising:

a frame;

a first housing removably supported on the frame;

a fruit and vegetable processor removably mounted on the first housing, the processor including a grater rotatable about a generally vertically extending axis, an impeller disposed below the grater and also rotatable about said axis, the impeller including a circular disk having a plurality of radially extending vanes on its upper surface, and a discharge chute associated with the impeller and through which grated fruit and vegetables may be discharged, the discharge chute being provided with a baffle movable between open and closed positions, the baffle normally being positioned in its closed position at the start of the cycle of operation and being shifted to its open position as material is being impelled through the discharge chute, the baffle then being moved to its closed position during the operation of the press means;

a hopper mounted above the processor in communication with the grater;

a press bag having open and closed ends;

press bag support means removably supporting the press bag with its open end in communication with the discharge chute;

a juice collector supported by the frame below the press bag;

drive means for driving the processor to cause fruit and vegetables within the hopper to be grated and impelled through the discharge chute into the press bag, the drive means including a motor mounted within the first housing;

press means supported by the frame for pressing the press bag to squeeze juice from the grated fruit and vegetables which have been impelled into the press bag by the processor, the squeezed juice flowing by gravity from the press bag to the collector; and control means mounted on the frame for controlling the functions of the drive means and the press means.

4. A fruit and vegetable juice press assembly comprising:

a frame a housing supported on the frame;

a fruit and vegetable processor mounted on the housing, the processor including a grater, an impeller, and a discharge chute associated with the impeller through which grated fruit and vegetables may be discharged;

a hopper mounted above the processor and in communication with the grater;

a press bag having a top open end and a bottom closed end;

press bag support means removeably supporting the press bag with its open end in communication with the discharge chute;

a juice collector supported by the frame below the press bag;

drive means for driving the processor to cause fruit and vegetables within the hopper to be grated and impelled through the discharge chute into the press bag;

press means supported by the frame for pressing the press bag to squeeze juice from the grated fruit and vegetables received from the processor, squeezed the juice flowing by gravity from the press bag to the juice collector, wherein the housing includes a first support lip to one side of the top of the press bag, and the press means includes a second support lip to the other side of the top of the press bag, the press bag support means being mounted on the first and second support lips; and control means mounted on the frame for controlling the functions of the drive means and the press means.

5. The press assembly as set forth in claim 4 wherein the press bag support means includes two normally spaced apart support members and spring means engaging the ends of the support members and normally biasing them apart.

6. The press assembly as set forth in claim 5 wherein the spaced apart support members and the spring means are all formed from spring wire, the spring means being a coil of spring wire.

7. The press assembly as set forth in claim 5 wherein the sides of the press bag next to the open end are provided with a plurality of grommets, and wherein each of the spaced apart support members is provided with hooks engagable with the grommets to support the press bag.

8. The press assembly as set forth in claim 7 wherein the hooks extend at an angle to the associated support members and lie on the bag side of the support members, and wherein the juice press assembly further includes resilient means which engage the press bag and the press bag support means to force the grommets in engagement with the hooks.

9. A fruit and vegetable juice press assembly comprising:

a frame first and second horizontally spaced apart housings supported on the frame;

a fruit and vegetable processor mounted on the housing, the processor including a grater, an impeller, and a discharge chute associated with the impeller through which grated fruit and vegetables may be discharged;

a hopper mounted above the processor and in communication with the grater;

a press bag having a top open end and a bottom closed end;

press bag support means removeably supporting the press bag between the first and second housings with its open end in communication with the discharge chute;

a juice collector supported by the frame below the press bag;

drive means for driving the processor to cause fruit and vegetables within the hoper to be grated and impelled through the discharge chute into the press bag, the drive means including a motor mounted within the first housing;

press means supported by the frame for pressing the press bag to squeeze juice from the grated fruit and vegetables received from the processor, the squeezed juice flowing by gravity from the press bag to the juice collector, and wherein the press means includes an air bag mounted on the frame, means for inflating and deflating the air bag, the second housing enclosing the air bag, and means for inflating the air bag, a cylindrical rod secured to the press bag and extending through the second housing in a direction towards the air bag, and a platen having a pressing surface, the platen being removeably secured to the end of the cylindrical rod disposed outwardly of the second housing; and control means mounted on the frame for controlling the functions of the drive means and the press means.

10. The press assembly as set forth in claim 9 wherein the first housing is supported on the frame in such a manner that a portion of the first housing adjacent the filter bag forms a fixed pressing surface, and at least one of the pressing surfaces which engages the press bag having a washboard-like configuration.

11. A fruit and vegetable juice press assembly comprising:

a frame a housing supported on the frame;

a fruit and vegetable processor mounted on the housing, the processor including a grater, an impeller, and a discharge chute associated with the impeller through which grated fruit and vegetables may be discharged;

a hopper mounted above the processor and in communication with the grater;

a press bag having a top open end and a bottom closed end;

press bag support means removeably supporting the press bag with its open end in communication with the discharge chute;

a juice collector supported by the frame below the press bag;

drive means for driving the processor to cause fruit and vegetables within the hopper to be grated and impelled through the discharge chute into the press bag;

press means supported by the frame for pressing the press bag to squeeze juice from the grated fruit and vegetables received from the processor, the juice flowing by gravity from the press bag to the juice collector, the press means including a platen moveable towards and away from the housing, the press bag being disposed between the platen and a fixed press surface on the housing, and wherein the discharge chute is provided with a baffle moveable between open and closed positions, the baffle normally being positioned in its closed position at the start of a cycle of operation and being shifted to its open position as the material is being impelled through the discharge chute, the platen engaging the baffle as it is pressing the fruit and vegetables received in the bag to shift the baffle back to its closed position; and control means mounted on the frame for controlling the functions of the drive means and the press means.

* * * * *